(12) United States Patent
Ricciardi et al.

(10) Patent No.: US 8,072,970 B2
(45) Date of Patent: Dec. 6, 2011

(54) POST ANSWER CALL REDIRECTION VIA VOICE OVER IP

(75) Inventors: Dominic Ricciardi, Bridgewater, NJ (US); Harish Samarasinghe, Holmdel, NJ (US); Gautham Natarajan, Morganville, NJ (US); Robert Yaeger Peters, Jr., Rumson, NJ (US); James Ibezim, Wayside, NJ (US); Martin C. Dolly, Forked River, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 12/506,851

(22) Filed: Jul. 21, 2009

(65) Prior Publication Data

US 2009/0279539 A1    Nov. 12, 2009

Related U.S. Application Data

(63) Continuation of application No. 10/805,758, filed on Mar. 22, 2004, now Pat. No. 7,567,555.

(51) Int. Cl.
| | |
|---|---|
| *H04L 12/16* | (2006.01) |
| *H04L 12/66* | (2006.01) |
| *H04M 3/42* | (2006.01) |
| *H04Q 11/00* | (2006.01) |
| *G06F 15/16* | (2006.01) |

(52) U.S. Cl. ........ 370/356; 370/261; 370/264; 370/266; 370/354; 370/389; 370/395.54; 370/466; 370/474; 379/158; 379/203.01; 379/205.01; 379/207.01; 709/227; 709/238; 709/246

(58) Field of Classification Search .......... 370/228–503; 379/88.17, 88.13, 203.01, 204.01, 205.01, 379/207.01, 158; 709/205–248

See application file for complete search history.

(56) References Cited

U.S. PATENT DOCUMENTS

| | | | |
|---|---|---|---|
| 5,771,282 A | 6/1998 | Friedes | |
| 5,790,176 A | 8/1998 | Craig | |
| 5,864,563 A | 1/1999 | Ratcliffe | |
| 5,864,850 A | 1/1999 | Nordman | |
| 5,867,494 A | 2/1999 | Krishnaswamv et al. | |
| 5,898,769 A | 4/1999 | Furman | |
| 5,915,013 A | 6/1999 | Mintz et al. | |
| 5,923,742 A | 7/1999 | Kodialam et al. | |
| 5,926,649 A | 7/1999 | Ma et al. | |
| 5,983,217 A | 11/1999 | Khosravi-Sichani et al. | |
| 6,038,230 A | 3/2000 | Ofek | |

(Continued)

FOREIGN PATENT DOCUMENTS

EP    0 866 626 A1    2/1998

(Continued)

*Primary Examiner* — Lisa Hashem

(57) ABSTRACT

A method is provided for forming a multi-media communication path between at least first, second and third communication devices coupled to a multi-media provider system during post answer call redirecting and/or teleconferencing. The method includes receiving and processing a first call request at a circuit-based portion of the multi-media provider system for forming a first communication link between the first and second communication devices. Thereafter, predetermined attributes of the first communication link may be sent to an IP-based portion of the multi-media provider system for configuring the IP-based portion of the multi-media provider system to process a subsequent request to execute post answer call redirecting and/or teleconferencing. Upon detecting the request to execute the post answer call redirecting and/or teleconferencing in the first communication link, the IP-based portion of the multi-media provider systems responds by forming the multi-media communication path between at least first, second and third communication devices.

20 Claims, 3 Drawing Sheets

U.S. PATENT DOCUMENTS

| | | | |
|---|---|---|---|
| 6,101,494 A | 8/2000 | Khosravi-Sichani et al. | |
| 6,138,144 A * | 10/2000 | DeSimone et al. | 709/204 |
| 6,144,667 A * | 11/2000 | Doshi et al. | 370/401 |
| 6,148,071 A | 11/2000 | Friedes et al. | |
| 6,161,134 A | 12/2000 | Wang et al. | |
| 6,178,400 B1 | 1/2001 | Eslambolchi | |
| 6,240,391 B1 | 5/2001 | Ball et al. | |
| 6,259,691 B1 | 7/2001 | Naudus | |
| 6,272,131 B1 | 8/2001 | Ofek | |
| 6,272,132 B1 | 8/2001 | Ofek et al. | |
| 6,330,236 B1 | 12/2001 | Ofek et al. | |
| 6,356,294 B1 | 3/2002 | Martin et al. | |
| 6,377,579 B1 | 4/2002 | Ofek | |
| 6,377,674 B1 | 4/2002 | Chong et al. | |
| 6,401,099 B1 | 6/2002 | Koppolu et al. | |
| 6,404,746 B1 * | 6/2002 | Cave et al. | 370/262 |
| 6,421,674 B1 | 7/2002 | Yoakum et al. | |
| 6,434,143 B1 | 8/2002 | Donovan | |
| 6,438,555 B1 | 8/2002 | Orton | |
| 6,438,594 B1 | 8/2002 | Bowman-Amuah | |
| 6,446,127 B1 | 9/2002 | Schuster et al. | |
| 6,460,058 B2 | 10/2002 | Koppolu et al. | |
| 6,466,550 B1 | 10/2002 | Foster et al. | |
| 6,477,150 B1 | 11/2002 | Maggenti et al. | |
| 6,480,588 B1 | 11/2002 | Donovan | |
| 6,483,600 B1 | 11/2002 | Schuster et al. | |
| 6,574,469 B1 * | 6/2003 | Xiang et al. | 455/416 |
| 6,594,257 B1 * | 7/2003 | Doshi et al. | 370/352 |
| 6,654,455 B1 * | 11/2003 | Isaka | 379/202.01 |
| 6,721,401 B2 * | 4/2004 | Lee et al. | 379/93.17 |
| 6,771,644 B1 | 8/2004 | Brassil et al. | |
| 6,857,072 B1 | 2/2005 | Schuster et al. | |
| 6,934,756 B2 | 8/2005 | Maes | |
| 6,937,596 B2 * | 8/2005 | Sjolund et al. | 370/352 |
| 6,947,417 B2 | 9/2005 | Laursen et al. | |
| 6,996,094 B2 | 2/2006 | Cave et al. | |
| 7,031,747 B2 * | 4/2006 | Cyr et al. | 455/552.1 |
| 7,035,260 B1 | 4/2006 | Betta et al. | |
| 7,079,495 B1 * | 7/2006 | Pearce et al. | 370/260 |
| 7,180,912 B1 | 2/2007 | Samarasinghe | |
| 7,245,611 B2 * | 7/2007 | Narasimhan et al. | 370/354 |
| 7,254,643 B1 * | 8/2007 | Peters et al. | 709/246 |
| 7,283,516 B1 | 10/2007 | Ganesan et al. | |
| 7,330,483 B1 * | 2/2008 | Peters et al. | 370/466 |
| 7,359,373 B2 | 4/2008 | Kuusinen et al. | |
| 7,366,163 B1 | 4/2008 | Samarasinghe et al. | |
| 7,369,493 B2 | 5/2008 | Ibezim et al. | |
| 7,411,943 B2 * | 8/2008 | Kittredge et al. | 370/352 |
| 7,443,834 B1 * | 10/2008 | Sylvain | 370/352 |
| 7,474,634 B1 * | 1/2009 | Webster et al. | 370/261 |
| 7,567,555 B1 * | 7/2009 | Ricciardi et al. | 370/356 |
| 7,733,821 B2 * | 6/2010 | Kolor et al. | 370/328 |
| 7,773,585 B2 * | 8/2010 | Donovan | 370/352 |
| 7,885,208 B2 * | 2/2011 | Mutikainen et al. | 370/260 |
| 7,948,973 B2 * | 5/2011 | Peters et al. | 370/356 |
| 2001/0020243 A1 | 9/2001 | Koppolu et al. | |
| 2002/0082730 A1 | 6/2002 | Capps et al. | |
| 2002/0103824 A1 | 8/2002 | Koppolu et al. | |
| 2003/0002448 A1 * | 1/2003 | Laursen et al. | 370/261 |
| 2003/0014488 A1 * | 1/2003 | Dalal et al. | 709/204 |
| 2006/0239249 A1 | 10/2006 | Banner et al. | |
| 2006/0239257 A1 | 10/2006 | Banner et al. | |
| 2007/0070981 A1 | 3/2007 | Croak et al. | |
| 2008/0022014 A1 * | 1/2008 | Peters et al. | 709/246 |
| 2009/0168764 A1 * | 7/2009 | Samarasinghe | 370/352 |
| 2009/0279539 A1 * | 11/2009 | Ricciardi et al. | 370/352 |

FOREIGN PATENT DOCUMENTS

| | | |
|---|---|---|
| EP | 1 179 927 A2 | 2/2002 |
| WO | WO 01/63877 A1 | 8/2001 |
| WO | WO 01/63956 A1 | 8/2001 |
| WO | WO 01/72007 A1 | 9/2001 |
| WO | WO 01/76172 A2 | 10/2001 |
| WO | WO 02/21859 A1 | 3/2002 |
| WO | WO 02/45439 A2 | 6/2002 |

* cited by examiner

POST ANSWER CALL REDIRECTION VIA VOICE OVER IP

This application is a continuation of U.S. patent application Ser. No. 10/805,758 filed Mar. 22, 2004 now U.S. Pat. No. 7,567,555, currently allowed, which is herein incorporated by reference in its entirety.

FIELD OF THE INVENTION

The present invention relates generally to a method for providing post answer call redirection in a voice over IP system, and more particularly to a method for providing post answer call redirection in a voice over IP system that makes efficient use of system resources for coupling at least first, second and third communication devices during teleconferencing.

BACKGROUND

Presently, SIP is becoming an increasingly popular protocol for transporting both standard and non-standard information in a common framework over Internet Protocol (IP) based communications systems (e.g., Local Area Networks (LANs)), such as systems and services provided by AT&T and/or other multi-media service providers. As many multi-media service providers incrementally transition from circuit-based communication systems, such as Public Switched Telephone Network (PSTN) communication systems, to IP-based communication systems, there has been a promulgation of hybrid communication systems. The hybrid communication systems includes a circuit-based portion running transaction capability protocol (TCAP), integrated services digital network (ISDN) User Part Protocol (ISUP), ISDN and other protocols suitable for operation on the circuit-based communication system. The hybrid communication system further includes an IP-based portion running Session Initiation Protocol (SIP) or other protocols suitable for operation on the IP-based communication system.

In the typical hybrid communication system, call requests that originate on the circuit-based portion of the system, which require resources of another element of the circuit-based portion of the system, such as for feature processing purposes, may require many signaling and processing resources to process. Another drawback of the typical hybrid communication system is related to the requirement that network resources be transported between elements of the communication system (i.e., between elements of the circuit and IP based portions of the communication system) for processing call requests, which elements provide the feature/application processing for the call requests. This transportation of network resources between elements of the hybrid communication system for processing various call requests contributes to an increase in overall network complexity of the communication system from a service management and provisioning perspective.

It would, therefore, be desirable to overcome the aforesaid and other disadvantages.

SUMMARY OF THE INVENTION

A method of forming a multi-media communication path between at least first, second and third communication devices is set forth in accordance with aspects of the present invention. In one aspect, the method includes receiving a first call request at a circuit-based portion of a multi-media provider system. The call request may be processed at the circuit-based portion of the multi-media provider system for forming a first communication link between the first and second communication devices. Further, predetermined attributes of the first communication link may be sensed (e.g., via a network gateway border element) and communicated to an IP-based portion of the multi-media provider system for configuring the IP-based portion of the multi-media provider system to provide at least one of a plurality of predetermined multi-media services. The first communication link may be monitored to detect a predetermined request for at least one of the plurality of multi-media services (e.g., post-answer call redirecting services or teleconferencing services).

After the predetermined attributes of the first communication link are sent or otherwise communicated to the IP-based portion of the multi-media provider system, the method further includes forming a first Real-Time Transport Protocol stream between the first communication device and an application server located on the IP-based portion the multi-media provider system. Similarly, a second Real-Time Transport Protocol steam may be formed between the second communication device and the application server located on the IP-based portion of the multi-media provider system.

In one aspect of the present invention, monitoring the first communication link for the predetermined request includes monitoring the first communication link for detecting a post-answer call redirect request. Furthermore, configuring the IP-based portion of the multi-media provider system to provide at least one of the plurality of predetermined multi-media services includes configuring the IP-based portion of the multi-media provider system to provide post-answer call redirecting services. After detecting the post-answer call redirect request, the method further includes forming a third Real-Time Transport Protocol stream between the third communication device and the application server located on the IP-based portion of the multi-media provider system.

The method further includes moving the first, second and third Real-Time Transport Protocol streams from the application server to a media server located on the IP-based portion of the multi-media provider system for enabling the media server to operate as a hub for the first, second and third Real-Time Transport Protocol streams. The media server may thereafter be controlled to mix the first, second and third Real-Time Transport Protocol streams for providing the multi-media communication path between at least the first, second and third communication devices.

After controlling the media server to mix the first, second and third Real-Time Transport Protocol streams, the method further includes disabling the monitoring of the first communication link for the post-answer call redirect request. Thereafter, the media server may be controlled to monitor the multi-media communication path for at least one of a plurality of conferencing instructions.

BRIEF DESCRIPTION OF THE DRAWING

The foregoing and other objects of this invention, the various features thereof, as well as the invention itself, can be more fully understood from the following description, when read together with the accompanying drawings in which.

DETAILED DESCRIPTION OF THE INVENTION

In accordance with principles of the present invention, set forth is a method of providing users of communication devices with post answer call redirection, via voice over IP, as will be described in detail below in connection with FIGS. 1, 2 and 3. In one aspect, post answer call redirection may be employed by a called party to redirect an existing call to a target part for forming multi-way multi-media communications between calling, called and target parties, as will also be described in further detail below in connection with FIGS. 1, 2 and 3. In another aspect, post answer call redirection may be employed for redirecting a call to the target party for forming a two-way call between the calling and target party, where the redirecting party has dropped the call, as will also be described in further detail below in connection with FIGS. 1, 2 and 3.

Figure 1:
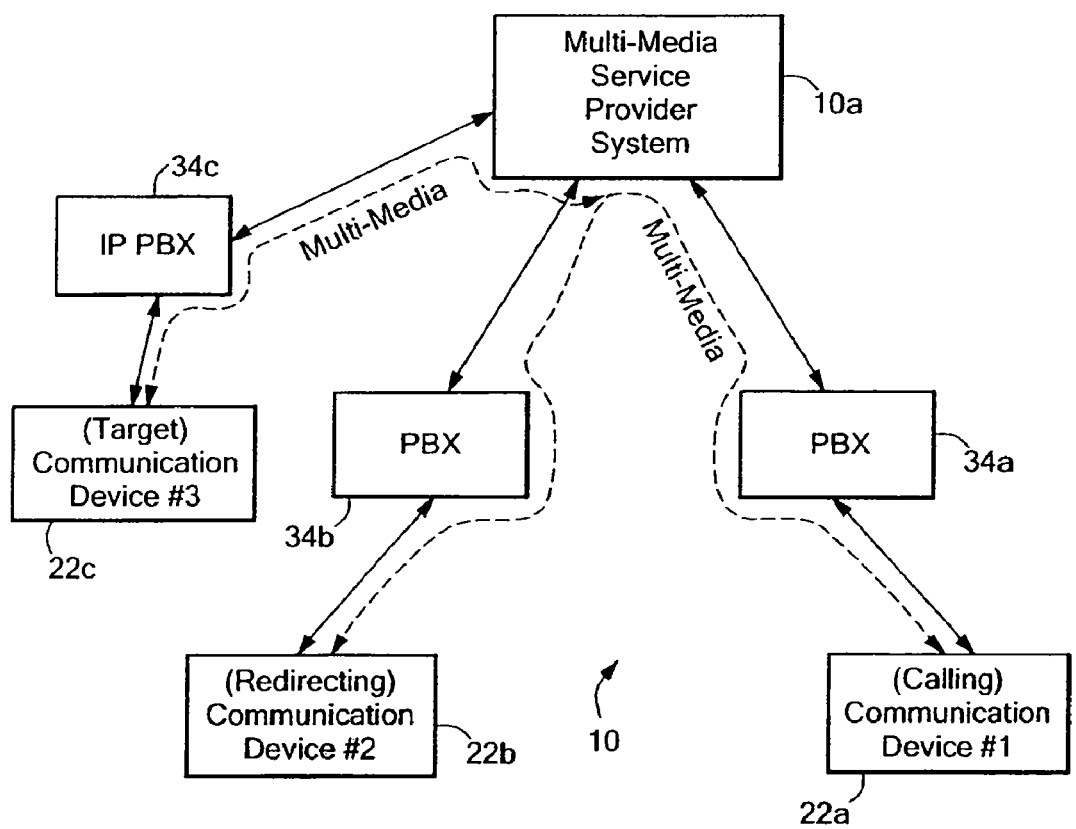
FIG. 1 is an exemplary high-level schematic block diagram of a system for providing multi-media communications between a plurality of communication devices according to the present invention.

Referring now to FIG. 1, shown is one embodiment of a communication network 10 for providing multi-media communications between at least first 22a, second 22b and third 22c communication devices of a plurality of communication devices, in accordance with the present invention. The communication network 10 includes a multi-media provider system 10a, which is operative to provide a plurality of multi-media services to the first 22a, second 22b and third 22c communication devices, via respective first 34a, second 34b and third 34c Private Branch Exchanges (hereinafter referred to as "PBXs"). The first and second PBXs 34a, 34b, may be circuit based devices and the third PBX 34c may be a SIP-enable IP based device. It should be understood that the multi-media services provider system 10a is additionally operative to provide a plurality of multi-media services to a plurality of other communication devices not specifically shown herein.

In this arrangement and as will become apparent below, a calling party operating at the first communication device 22a may communicate with a called or redirecting party operating at the second communication device 22b, via the first PBX 34a, multi-media service provider system 10a and second PBX 34b. Thereafter, the second communication device 22b may redirect the incoming call received from the first communication 22a to the third communication device 22c, via the multi-media service provider system 10a and third PBX 34c, for forming multi-way multi-media communications between the first, second and third communication devices 22a, 22b, 22c.

Figure 2:
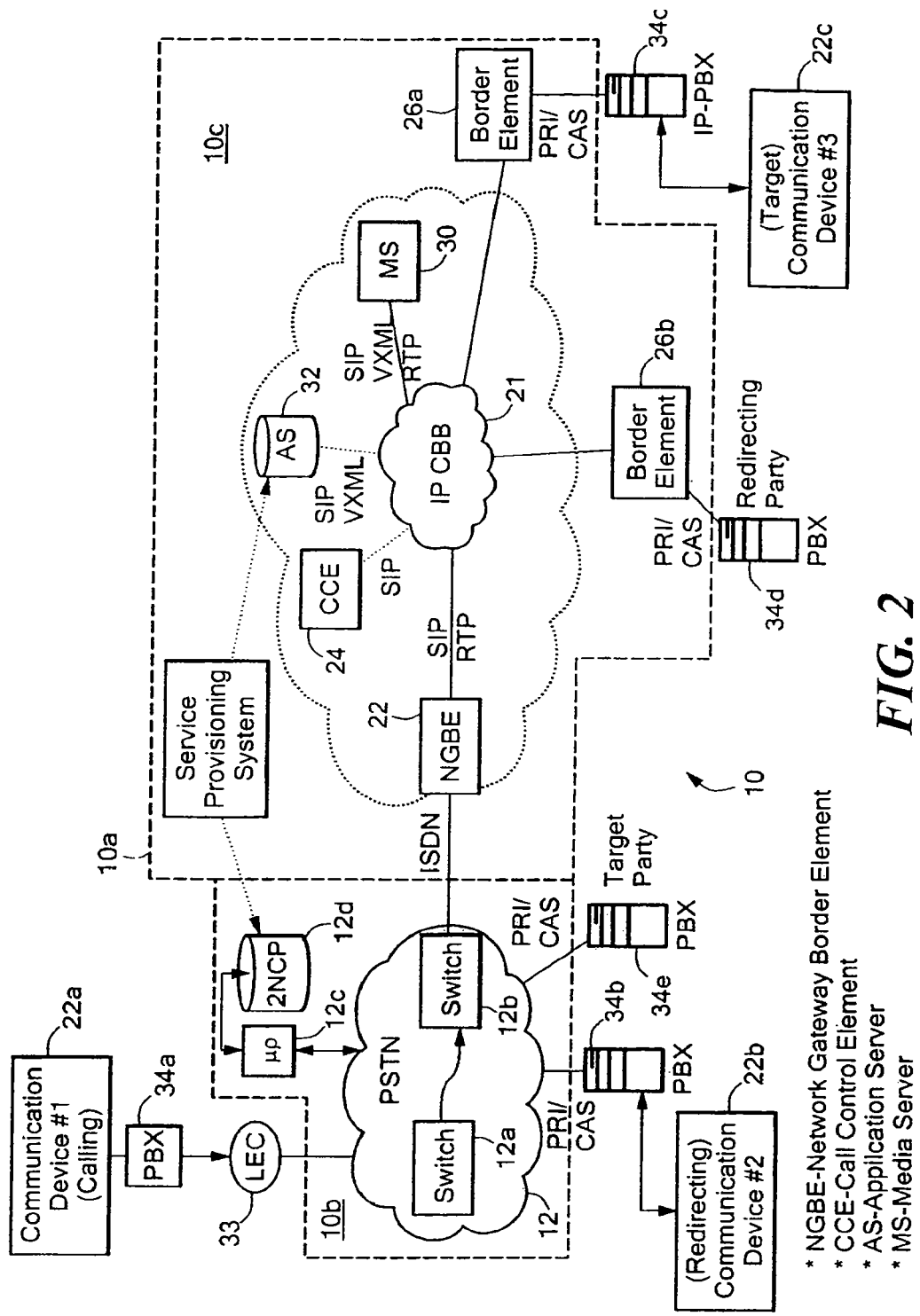
FIG. 2 is an expanded schematic block diagram of the system shown in FIG. 1.

Referring to FIG. 2, in the exemplary embodiment, the multi-media services provider system 10a includes a circuit-based communication portion 10b and an IP-based communication portion 10c. The circuit-based communication portion 10b includes a Public Switched Telephone Network (PSTN) 12 having a plurality of switches 12a, 12b coupled to communicate with at least one micro-processor 12c. The micro-processor 12c is coupled to a database 12d, which stores a plurality of public and/or proprietary information related to customer and feature logic, such as call prompting service, toll free service and post answer call redirect service and the like.

The IP-based communication portion 10c includes a centrally located IP Communication Backbone (IP-CBB) 21, which is coupled to a Network Gateway Border Element 22 (NGBE), a Call Control Element 24 (CCE), a Media Server (MS) 30, an Application Server (AS) 32 and a plurality of Border Elements (BEs) 26a, 26b. The NGBE 22 is coupled to the switch 12b located on the PSTN 12 of the circuit-based communication portion 10b and operates as a primary communication interface between the circuit-based communication portion 10b and the IP-based communication portion 10c. The AS 32 is coupled to a Service Provisioning System (SPS), which is in a communication relationship with the database 12d located on the circuit-based communication portion 10b. The BEs 26a, 26b are respectively coupled to IP-PBX 34c and PBX 34d.

In the exemplary embodiment, the first communication device 22a is coupled to the PSTN 12 of the circuit-based communication portion 10b, via the PBX 34a and a local exchange carrier (LEC) 33. The second communication device 22b is coupled to the PSTN 12 of the circuit-based communication portion 10b, via the PBX 34b. The third communication device 22c is coupled to the PSTN 12 of the circuit-based communication portion 10b, via the IP-PBX 34c and the IP-based communication portion 10c. It should be understood that the first, second and third communication devices 22a, 22b, 22c may be coupled to the multi-media provider system 10a in a number of different ways, for example, the second communication device 22b could be coupled to the PBX 34d, which is coupled to the IP-based communication portion 10c of the multi-media provider system 10a.

The NGBE 22 located on the IP-based communication portion 10c may include an IP-switch or transport that is adapted to receive and translate information from the circuit-based communication portion 10b of the multi-media services provider system 10a to information suitable for communication on the IP-based communication portion 10c of the multi-media services provider system 10a. The NGBE 22, for example, may be provided by Lucent Corporation of Murray Hill, N.J.

The IP-CBB 21 may include one or more routers, IP-switches and/or transports that are adapted to receive a number of Session Initiation Protocol (SIP) INVITE messages from the NGBE 22, which may include a number of requests for multi-media services. The IP-CBB 21 may be further adapted to redirect the number of requests for multi-media services to the CCE 24 for validation and further processing. In the exemplary embodiment, the IP-CBB 21 includes one or more routers, which may be provided by Cisco Systems, Inc. of San Jose, Calif.

The CCE 24, for example, may be provided by Lucent Corporation of Murray Hill, N.J. or by Alcatel of Plano, Tex. The CCE 24 may be defined as a back-to-back user agent (B2BUA), which operates to receive a plurality of INVITE messages from the NGBE 22, as described above, or from any one of the plurality of BEs 26a, 26b and upon receipt of the plurality of INVITE messages from the NGBE 22 or plurality of BEs 26a, 26b, the CCE 24 can initiate an equal plurality of INVITE messages to the AS 32. The AS 32 can process each INVITE message to provide feature processing for the call and/or to set up the call, as will be described in further detail below.

Optionally, the CCE 24 may be adapted to use "Third Party Call Control," which is described in the reference, "Third Party Call Control in SIP" by Rosenberg, Peterson, Schulzrinne, Camarillo, RFC-Draft, Internet Engineering Task Force, Mar. 2, 2001," which is herein incorporated by reference. The Third Party Call Control feature of the CCE 24, permits the CCE 24 to create a call in which communication is actually between other parties. For example, an operator can use Third party Call Control to create a call that connects two participants together or similarly, the CCE 24 can use Third Party Call Control to connect the MS 30 and the first communication device 22a. Generally, Third Party Call control allows the CCE 24 to connect the various end callers without having the media stream pass through the CCE 24 and yet, the CCE 24 can still maintain call state information.

Moreover, the CCE 24 is adapted to receive and process a number of incoming INVITE messages, via the IP-CBB, which originate from various elements of the multi-media provider system 10a or from other devices and/or network elements. For example, the CCE 24 can receive an INVITE message from any one of the plurality of BEs 26a, 26b for calls initiated directly to the IP-based communication portion 10c (e.g., call originating from the third communication device 22c). Further, the CCE 24 can receive an INVITE message from the NGBE 22 for calls initiated at the circuit-based communication portion 10b, which are redirected to the IP-based communication portion 10c (e.g., calls originating from the first and/or second communication devices 22a, 22b). The CCE 24 is also adapted to process the number of INVITE messages received from the plurality of BEs 26a, 26d or NGBE 22, as described above, to generate a number outgoing INVITE messages. The number of outgoing INVITE messages can be communicated from the CCE 24 to any one or more of a number of network elements, such as to the MS 30 or as 32.

In the exemplary embodiment, the plurality of BEs 26a, 26b can be provided by Lucent Corporation of Murray Hill, N.J. In one embodiment, the plurality of BEs 26a, 26b are adapted to use SIP as the signaling protocol for interfacing with the IP-CBB 21.

In the exemplary embodiment, the AS 32 can include a conventional computer server, such as an "NT-Server," which can be provided by Microsoft of Richmond, Washington or a "Unix Solaris Server," which can be provided by Sun Micro Systems of Palo Alto, Calif. The AS 32 can be programmed with conventional Web-page interface software such as: "Visual Basic," "Java," "JavaScript," "HTML/DHTML," "C++", "J+", "Perl," or "Perlscript," and "ASP." The AS 32 can each further be programmed with an operating system, Web server software and Web Application software, such as an e-commerce application and computer network interface software.

In addition, the AS 32 contain the intelligence (application) needed for offering multi-media services such as Toll-Free Calling or 800-Service, Post Answer Call Redirecting Service (PACR), Virtual Private Networks, and various multimedia features like email, "Click-To-Dial." In an embodiment, the intelligence may include customer logic and data, as well as, common logic and data that may be used by all customers. Based on the application, the AS 32 provides the call control instructions to the CCE 24 (and subsequently the appropriate IP related network components) in order to provide the multimedia services/features.

Although not specifically shown, the AS 32 can include a database, which may contain a service intelligence layer adapted for providing the plurality of multi-media services described above. The service intelligence layer may include customer logic and data, as well as common logic and data that is used by communication devices 22a, 22b, 22c, as well as a plurality of other communication devices coupled to the circuit-based communication portion 10b and/or IP-based communication network 10c of the multimedia services provider network 10a, which are not be specifically shown in FIG. 2.

The MS 30 of the exemplary embodiment, is constructed and arranged to provide a plurality of predetermined announcements to the first, second and third communication devices 22a, 22b, 22c and to collect information from the communication devices 22a, 22b, 22c (e.g. caller-entered data). For example, if the calling party operating from the first communication device 22a is required to enter digits or a phrase for a Call Prompter service or Software Defined Network (SDN) service, the MS 30 will play the announcement prompting the caller to enter the required information. The MS 30 also collects the information entered by the caller. The MS 30 plays the announcements to the caller based on the instructions and announcement ID provided in the INVITE message received from the AS 32. In one embodiment, the announcements can include "Service Terminating" announcements or announcements for the caller to enter an authorization code, account code, or "call-prompter" digits.

In an embodiment, the NGBE 22 provides a Post Answer trigger mechanism (e.g., *T), and sends the results to the AS 32 (via CCE 24). The NGBE 22 may also be instructed to collect the redirecting party destination number upon invocation. The AS 32 receives the data from the NGBE 22 (via CCE 24), performs analysis, and determines any next steps. The MS 30 is employed to provide help announcements, subsequent digit collection of the redirecting party destination number (e.g., redirecting party enters incorrect #, prompted to try again) or to provide audio mixing (conferencing) for the PACR conference features. The redirecting party media stream is moved to the MS 30 and digit collection is provided. The calling party media stream is also moved to provide recurring "please hold" announcement (caller placed on hold when transfer is taking place) or the calling party, redirecting party, and target party media streams are moved to the MS 30 and bridged accordingly for conferencing capabilities. It should be understood that the MS 30 may also be used to provide digit collection after the AS 32 receives the *T trigger from the NGBE 22.

In an exemplary embodiment, the MS 30 can be defined as a VoiceXML based MS 30. The MS 30 provides various announcements and collects various information from callers operating from communication devices 22a, 22b or 22c when features requiring caller interaction are required to complete a call. For example, if the caller must enter digits or a phrase for a Call Prompter service or SDN service, which can be provided by the multi-media services provider system 10a, the MS 30 will play the announcement prompting the caller to enter the required information. The MS 30 further collects the caller-entered data.

The first, second and third communication devices 22a, 22b, 22c can include a plurality of SIP-enabled devices, such as telephones, personal computers and IP-Private Branch Exchanges ("PBXs"). In addition, the first, second and third communication devices 22a, 22b, 22c can include a plurality of SIP-enabled wireless devices, such as cellular telephones, pagers and personal digital assistants ("PDAs").

Figure 3:
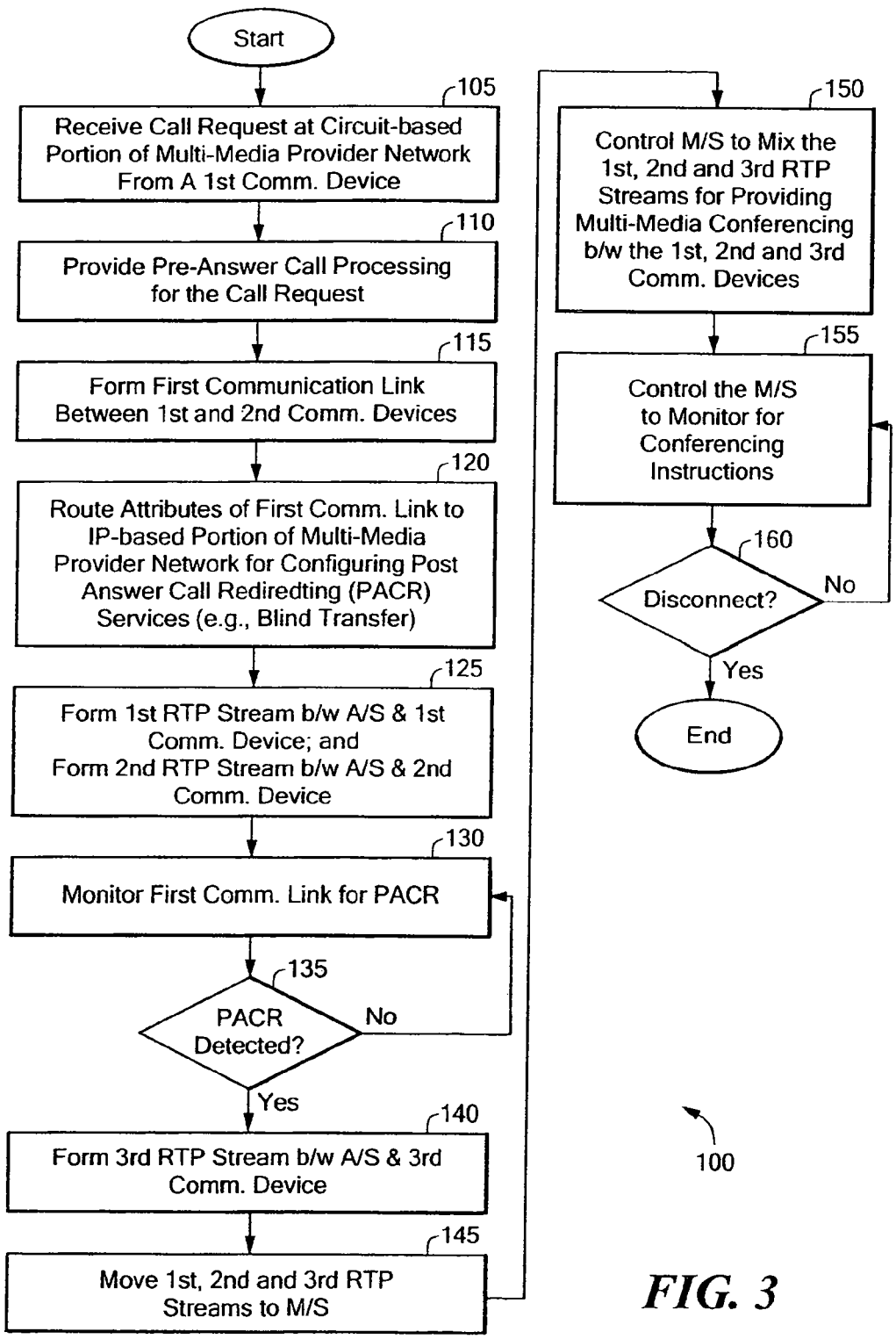
FIG. 3 is a flow chart illustrating a method for executing one exemplary multi-media service on the system of FIG. 1.

During operation and with reference to FIG. 3, the above-described multi-media provider system 10a may provide a plurality multi-media services to a plurality of communication devices, such as communication devices 22a, 22b, 22c. For example, the multi-media provider system 10a may provide a method 100 for executing post answer call redirection services (i.e., Teleconferencing services, Blind Transfer or Consult and Conference). The method 100 includes receiving a first call request message at the PSTN 12 of the circuit-based communication portion 10b located on the multimedia services provider network 10a from a first user operating at the first communication device 22a, at step 105. At step 110, the PSTN 12 queries the first call request message and routes the first call request message to the microprocessor 12e with instructions to execute account logic for applying any pre-answer call processing, such as area code routing. Based on the location and area code and/or user identifier of the calling party operating at the first communication device 22a, the microprocessor controls and/or instructs the PSTN 12 to route the call to a predetermined one of the communication devices, which in the exemplary embodiment is the second communication device 22b (hereinafter "redirecting communication device 22b"). At step 115, the microprocessor 12c controls the PSTN 12 to form a first communication link between the calling party operating at the first communication device 22a and the called or redirecting party operating at the second communication device 22b. At this point, the first communication link establishes a post-answer communication relationship between the calling party operating at the first communication device 22a and the called or redirecting party operating at the second communication device 22b.

At step 120, after forming the first communication link between the calling party operating at the first communication device 22a and the called or redirecting party operating at the second communication device 22b, the microprocessor 12d further controls and/or instructs the PSTN 12 to route attributes of the first communication link to the IP-based communication portion 10c of the multimedia provider system 10a for configuring the IP-based communication portion 10C to provide post answer call redirecting and/or media services. Accordingly, under control of the microprocessor 12d, the switches 12a, 12b of the PSTN 12 are actuated to route the attributes of the first communication link to the NGBE 22 using an ISUP format for (TCF) processing. The NGBE 22 receives and process the attributes of the first communication link by converting the attributes of the first communication link from an ISUP format suitable for communication over the circuit-based communication portion 10b of the multimedia provider system 10a to a first SIP INVITE format suitable for communication over the IP-based communication portion 10c of the multimedia provider system 10a.

In order to configure the IP-based communication portion 10C of the multi-media provider system 10 for providing post answer call redirecting services, as described above, the NGBE 22 forwards the first SIP INVITE message to the CCE 24, via the IPCBB, which first SIP INVITE message is identified as a Transfer Connect Service (TCS) first call redirect configuration request. In the exemplary embodiment, TCS is defined as AT&T's brand name associated with 8YY Post Answer Call Redirection features. The CCE 24 processes and/or validates the first SIP INVITE message and generates a second SIP INVITE message that is subsequently communicated to the AS 32, via the IP-CBB.

At step 125, the AS 32 receives and processes the second SIP INVITE message by executing predetermined customer account logic for determining the TCS subscription data and the AS 32 sets up a first Real-Time Transport Protocol (RTP) media stream between itself (i.e., the AS 32) and the calling communication device 22a, via the IP-CBB, NGBE 22, PSTN 12 and PBX 34a. Similarly, the AS 32 also sets up a second RTP media stream between itself(i.e., the AS 32) and the redirecting communication device 22b, via the IP-CBB, NGBE 22, PSTN 12 and PBX 34b.

At step 130, the AS 32 further instructs the NGBE 22 to monitor the post answer first communication link formed between the first and second communication devices 22a, 22b to detect a predetermined command or characters associated with a request to execute post answer call redirecting services. In an embodiment, the predetermined command or characters associated with the request to execute post answer call redirecting services include the terms *t followed by 10 predetermined digits associated with an address of a target party operating at the third communication device 22c, for example.

At step 135, a determination if made as to whether a request for post answer call redirecting services is detected by the NGBE 22. If the NGBE 22 does not detect the request for post answer call redirecting services, the NGBE 22 continues to monitor, as described above in step 130. However, upon detecting in the first communication link the terms *t followed by the 10 predetermined digits, which represents a request for post answer call redirecting services, the NGBE 22 collects and reports the terms *t followed by the 10 predetermined digits to the AS 32 using a third SIP INVITE message.

At step 140, the AS 32 receives and processes the terms *t and 10 predetermined digits, which digits provide an address associated with the third communication device 22c, by forming a third RTP stream between itself (i.e., the AS 32) and the third party operating at the third communication device 22c. At step 145, the AS 32 moves the first RTP stream previously formed between the AS 32 and the calling party operating at the first communication device 22a; the second RTP stream previously formed between the AS 32 and the redirecting party operating at the second communication device 22b and the third RTP stream previously formed between the AS 32 and the target party operating at the third communication device 22c to the MS 30 along with instruction to mix the first, second and third RTP streams. At step 150, the MS 30 mixes the first, second and third RTP streams to provide the calling, redirecting and target parties respectively operating at the first, second and third communication devices 22a, 22b, 22c, with full multi-way multi-media communications.

After fanning the full multi-way multi-media communications between the calling, redirecting and target parties, the AS 32 moves the monitoring operations described above from the NGBE 22 to the MS 30. In one embodiment and at step 155, the AS 32 controls the MS 30 to monitor communications originating from the redirecting party operating at the second communication device 22b to detect and execute predetermined conferencing instructions, such as mute, calling party hold, target party hold, disconnect and the like. In this exemplary embodiment, the redirecting party operating at the second communication device 22b has exclusive control over the predetermined conferencing instructions.

It should be understood that the above described calling, redirecting and target parties respectively associated with the first, second and third communication devices 22a, 22b, 22c have been set forth for exemplary purposes. In other embodiments, for example, the redirecting party can be redefined to operate from a fourth communication device (not shown) coupled to the PBX 34d. Although not specifically shown, it should also be understood that the multimedia provider system 10a may be expanded to include a number of other target parties operating at a like number of other communication devices, which can also be mapped into a multiple-way conferencing call using the post answer call redirecting features of the present invention.

It should also be understood that the system 10 of the present invention reduces the overall network resources required to provide PACR (i.e., BE 26a, 26b monitors, AS 32 provides application, MS 30 is invoked for feature processing during transfer actions by a receiving party (if needed). Further, the AS 32 remains in the call processing path and acts as a Back to Back User Agent, where actions are provided during and after call setup. The BE 26a, 26b monitors for triggers based on invocation from the AS 32 (via CCE 24) and the monitoring features may be started/stopped by applications located in the AS 32. The monitoring features, as described above, may be invoked via industry standard, generic VoIP capability. For a VoIP network solution, the BE 26a, 26b is located in the call path, and thus is a required resource (i.e., reduces network resources). The MS 30 is used only for feature processing and is not invoked for the entire duration of the call, which provides a resource savings. The MS 30 is also used to provide resources for conferencing or n-way calling (e.g., rtp mixed audio).

While various features of the present invention are described herein in conjunction with exemplary embodiments having various components using a number of protocols, it should be understood that other suitable components and protocols can be used without departing from the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto. All references and publications cited herein are expressly incorporated herein by reference in their entirety.

What is claimed is:

1. A method of forming a multi-media communication path between a first communication device, a second communication device and a third communication device all of which are coupled to a multi-media provider system, comprising:
   receiving a call request at a circuit-based portion of a multi-media provider system;
   processing the call request at the circuit-based portion of the multi-media provider system for forming a first communication link between the first communication device and the second communication device in the circuit-based portion of the multi-media provider system;
   processing predetermined attributes in a first format for the circuit-based portion of the multi-media provider system into a second format for an Internet protocol-based portion of the multi-media provider system;
   sending the predetermined attributes of the first communication link to an internet protocol-based portion of the multi-media provider system before a request for one of a plurality of multi-media services is received, for configuring the internet protocol-based portion of the multi-media provider system to provide the one of the plurality of multi-media services associated with the third communication device; and
   monitoring the first communication link for the request for the one of the plurality of multi-media services.

2. The method of claim 1, further comprising:
   forming a first real-time transport protocol stream between the first communication device and an application server located on the internet protocol-based portion of the multi-media provider system.

3. The method of claim 2, further comprising:
   forming a second real-time transport protocol stream between the second communication device and the application server located on the internet protocol-based portion of the multi-media provider system.

4. The method of claim 3, wherein the monitoring the first communication link for the request comprises monitoring the first communication link for a post-answer call redirect request as directed by an application server.

5. The method of claim 4, wherein the configuring the internet protocol-based portion of the multi-media provider system to provide the one of the plurality of multi-media services comprises:
   configuring the internet protocol-based portion of the multi-media provider system to provide post-answer call redirecting services.

6. The method of claim 5, further comprising:
   forming a third real-time transport protocol stream between the third communication device and the application server located on the internet protocol-based portion of the multi-media provider system.

7. The method of claim 6, further comprising:
   moving the first, second and third real-time transport protocol streams to a media server located on the internet protocol-based portion of the multi-media provider system for enabling the media server to operate as a mediator for the first, second and third real-time transport protocol streams.

8. The method of claim 7, further comprising:
   instructing by the application server the media server to mix the first, second and third real-time transport protocol streams for providing the multi-media communication path between the first communication device, the second communication device and the third communication device.

9. The method of claim 8, further comprising:
   disabling the monitoring of the first communication link for the post-answer call redirect request.

10. The method of claim 9, further comprising:
    controlling the media server to monitor the multi-media communication path for one of a plurality of conferencing instructions.

11. The method of claim 9, further comprising:
    controlling the media server to monitor the multi-media communication path for one of a plurality of transfer instructions.

12. The method of claim 9, further comprising:
    controlling the media server to monitor the multi-media communication path for one of a plurality of courtesy transfer instructions.

13. The method of claim 9, further comprising:
    controlling the media server to monitor the multi-media communication path for one of a plurality of consult and transfer instructions.

14. The method of claim 9, further comprising:
    controlling the media server to monitor the multi-media communication path for one of a plurality of conference and transfer instructions.

15. An apparatus for forming a multi-media communication path between a first communication device, a second communication device and a third communication device all of which are coupled to a multi-media provider system, comprising:
    means for receiving a call request at a circuit-based portion of a multi-media provider system;
    means for processing the call request at the circuit-based portion of the multi-media provider system for forming a first communication link between the first communication device and the second communication device in the circuit-based portion of the multi-media provider system;
    means for processing predetermined attributes in a first format for the circuit-based portion of the multi-media provider system into a second format for an internet protocol-based portion of the multi-media provider system;

means for sending the predetermined attributes of the first communication link to an internet protocol-based portion of the multi-media provider system before a request for one of a plurality of multi-media services is received, for configuring the internet protocol-based portion of the multi-media provider system to provide the one of the plurality of multi-media services associated with the third communication device; and means for monitoring the first communication link for the request for the one of the plurality of multi-media services.

16. The apparatus of claim 15, further comprising:

means for forming a first real-time transport protocol stream between the first communication device and an application server located on the internet protocol-based portion of the multi-media provider system.

17. The apparatus of claim 16, further comprising:

means for forming a second real-time transport protocol stream between the second communication device and the application server located on the internet protocol-based portion of the multi-media provider system.

18. The apparatus of claim 15, wherein the means for monitoring the first communication link for the request monitors the first communication link for a post-answer call redirect request as directed by an application server.

19. The apparatus of claim 18, wherein the means for configuring the internet protocol-based portion of the multi-media provider system to provide the one of the plurality of multi-media services comprises:

means for configuring the internet protocol-based portion of the multi-media provider system to provide post-answer call redirecting services.

20. The apparatus of claim 19, further comprising:

means for forming a third real-time transport protocol stream between the third communication device and the application server located on the internet protocol-based portion of the multi-media provider system.

* * * * *